(12) United States Patent
Steacy

(10) Patent No.: US 6,558,515 B1
(45) Date of Patent: May 6, 2003

(54) DIVIDING WALL FRACTIONATION COLUMN CONTROL SYSTEM AND APPARATUS

(75) Inventor: Paul C. Steacy, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 2 days.

(21) Appl. No.: 09/840,543

(22) Filed: Apr. 23, 2001

(51) Int. Cl.[7] .............................. B01D 3/32; B01D 3/42
(52) U.S. Cl. ..................... 203/1; 196/111; 196/132; 202/158; 202/160; 203/2; 203/3; 203/98; 203/DIG. 9; 203/DIG. 18
(58) Field of Search .................. 202/158, 160, 202/181; 196/111, 141, 132; 203/1, 2, 3, DIG. 18, 100, DIG. 9, 98; 159/44; 73/861.42

(56) References Cited

U.S. PATENT DOCUMENTS

| 2,471,134 A | | 5/1949 | Wright ..................... 196/100 |
| 3,855,074 A | | 12/1974 | Mosler et al. ................. 203/2 |
| 4,230,533 A | | 10/1980 | Giroux ....................... 203/1 |
| 4,401,512 A | * | 8/1983 | Likins, Jr. .................. 202/160 |
| 4,894,145 A | * | 1/1990 | Jensen ......................... 203/2 |
| 5,755,933 A | * | 5/1998 | Ognisty et al. ............. 202/158 |
| 5,951,827 A | * | 9/1999 | Breedon ..................... 202/158 |

FOREIGN PATENT DOCUMENTS

WO      56 848    * 11/1999

OTHER PUBLICATIONS

Kister, "Distillation Operation" (McGraw Hill) p. 600.*
Mutalib, M.I. Abdul et al. *Operation and Control of Dividing Wall Distillation Columns* (Part 1) Trans IchemE, vol. 76, Part A, Mar. 1998, pp. 308–318.
Mutalib, M.I. Abdul et al. *Operation and Control of Dividing Wall Distillation Columns* (Part 2) Trans IChemE, vol. 76, Part A, Mar. 1998, pp. 319–334.
Halvorsen, I.J. et al. *Optimizing Control of Petlyuk Distillation: Understanding the Steady–State Behavior* Computers chem Engng, vol. 21, Suppl., 1997, pp. S249–S254.
Lestak, F. et al. *The Control of Dividing Wall Column* (Centre for Process Integration, UMIST, Manchester, UK) Chemical Engineering Research & Design, Institution of Chemical Engineers 1993, 71 (A3) ISSN 0263–8762 p. 307.
Rudd, H. *Thermal Coupling of Energy Efficiency* Supplement to The Chemical Engineer Aug. 27, 1992, s14.

* cited by examiner

*Primary Examiner*—Virginia Manoharan
(74) *Attorney, Agent, or Firm*—John G. Tolomei; James C. Paschall; David J. Piasecki

(57) ABSTRACT

A control method and apparatus for regulating the rate of vapor flow in the two adjacent sections of a dividing wall fractional distillation column are presented. The liquid level on a tray at the top of each section is used to control the rate of vapor flow through the tray. The liquid level is controlled by measuring the pressure differential across the tray in each section and varying the flow of liquid to this tray in response to the differential.

11 Claims, 1 Drawing Sheet

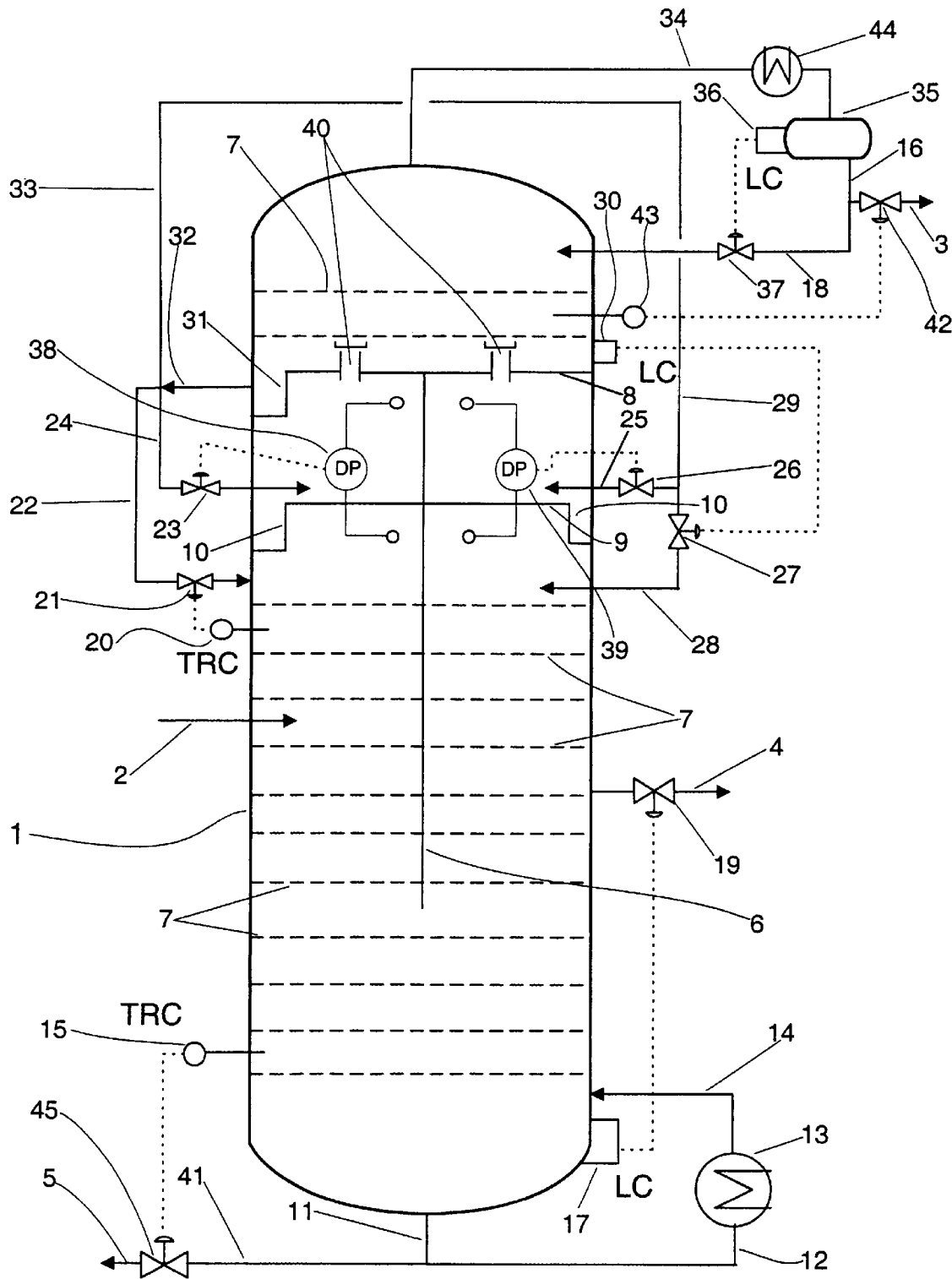

DIVIDING WALL FRACTIONATION COLUMN CONTROL SYSTEM AND APPARATUS

BACKGROUND OF THE INVENTION

1. Field of the Invention

The invention relates to the general field of process control as applied to fractional distillation columns used in the chemical, petrochemical and petroleum industries. The invention more specifically relates to a control system and apparatus for controlling a "dividing wall" fractional distillation column used to separate a feed stream into three or more product streams.

2. Related Art

Fractionation columns are widely employed to do myriad separations in a number of industries. Control systems for fractionation columns have therefore reached a high state of development including the use of on-line analytical instruments and computerized optimization. They still however, rely to a great extent on the measurement of temperatures and liquid levels in the fractionation column by equipment such as shown in U.S. Pat. No. 3,855,074 issued to H. A. Mosler et. al.

The dividing wall or Petyluk configuration for fractionation columns was initially introduced some 50 years ago by Petyluk et al. Dividing wall columns have been employed for the separation of hydrocarbon mixtures as evidenced by the disclosure of U.S. Pat. No. 2,471,134 issued to R. O. Wright. Recently the use of dividing wall columns has begun to expand because of the greater recognition that in certain situations dividing wall columns can provide benefits above those of conventional fractionation columns. For instance, a commercialization of a fractionation column employing this technique is described in the article appearing at page s14 of a supplement to The Chemical Engineer, Aug. 27, 1992.

The control systems for dividing wall columns are not as mature or as commonly described as for conventional columns. Studies of control variables and responses in a small scale pilot plant column are given in *Operation and Control of Dividing Wall Distillation Columns*, by A. Mutalib and R. Smith, Part 1: *Degrees of Freedom and Dynamic Simulation*, Trans. IChemE. Vol. 76, Part A, March 1998, pages 308–318 and Part 2: *Simulation and Pilot Plant Studies Using Temperature Control*, Trans. IChemE, Vol 76, Part A, March 1998, pages 319–334. Two other papers directed to the general control of dividing wall columns are *The Control of Dividing Wall Column* (Centre for Process Integration, UMIST, Manchester, UK) by F. Lestak and R. Smith appearing at page 307 of Chemical Engineering Research & Design, Institution of Chemical Engineers (1993) 71 (A3) and *Optimizing Control of Petlyuk Distillation: Understanding the Steady-State Behavior* by Ivar J. Halvorsen and Sigurd Skogestad at pages s249–s254 of Computers Chem. Engng., Vol. 21, Suppl., 1997 (Elsevier Science Ltd.)

An actual example of a control system for these columns is provided in U.S. Pat. No. 4,230,533 issued to V. A. Giroux. This latter reference is relevant as liquid is collected in an upper portion of the column and divided between the two sides of the dividing wall by level control. The flow rate of vapor upward in the two sides of the column is set by two valves in the lower portion of the column in response to an analyzer measuring the composition on one side of the dividing wall.

BRIEF SUMMARY OF THE INVENTION

The invention is an apparatus and method for controlling the relative flow rate of vapor in the two parallel contacting sections present in the central portion of a dividing wall column. The liquid level on the top tray of each section of the column is varied to control the rate of vapor flow through the respective section of the column. The liquid level on each of these two trays is in turn controlled by differential pressure measurement devices which measure the pressure above and below this tray and determine a pressure differential. Additional liquid flow into the top of the receiving section of the column is set by a temperature controller near this top tray, and the liquid flow into the top of the discharging section of the column is set by a level controller near the top tray.

An apparatus for controlling the relative rate of upward vapor flow in each of two parallel, partial-column contacting sections of a divided wall column, the column being divided into at least said two parallel divided wall contacting sections located in a middle portion of the column by a vertical dividing wall, said apparatus comprising a first differential pressure measuring device measuring the pressure differential between vapor-filled volumes located immediately above and below a first dedicated perforated tray located in an upper portion of a first partial-column contacting section of said column; a second differential pressure measuring device measuring the pressure differential between vapor-filled volumes located immediately above and below a second dedicated perforated tray located in an upper portion of a second partial-column contacting section of said column; a liquid collection tray located in the column above the first and second partial-column contacting sections of the column, the liquid collection tray having a liquid collection well and also having openings for the upward flow of vapor through the tray; a liquid withdrawal and distribution conduit system communicating with the liquid collection well of the liquid collection tray and comprising conduits for the passage of liquid from the liquid collection well to other points in the fractionation column including a first conduit having an outlet discharging onto the first dedicated tray and a second conduit having an outlet discharging onto the second dedicated tray; a first flow control valve located in the first conduit and controlling the rate of fluid flow through the first conduit in response to a signal generated by the first pressure differential measuring device; and, a second flow control valve located in the second conduit and controlling the rate of fluid flow through the second conduit in response to a signal generated by the second pressure differential measuring device.

BRIEF DESCRIPTION OF THE DRAWING

The drawing is a very simplified side view diagram of a dividing wall fractionation column showing the control system of the subject invention.

DETAILED DESCRIPTION AND EMBODIMENTS

Fractional distillation is a well developed unit operation employed in a large number of chemical, petrochemical and petroleum refining processes to separate a wide variety of chemical compounds. This prominence has led to a great effort to optimize column operation by improving the separation through better equipment and procedures, to reduce the cost of operating the process and to reduce the cost of the required equipment. A development made over 50 years ago with these objects in mind has evolved into what is now referred to as a dividing wall column. The advantages of this fractionation column arrangement are now becoming more widely accepted and dividing wall columns are being applied to a larger number of separations. Before going further, it is useful to define what is referred to herein as a dividing wall column. By this term it is intended to identify a fractional distillation column, of general applicability, which has as one of its basic components a substantially fluid tight vertical wall extending through a significant portion of its height and located in a central portion of the column to divide this central portion into at least two vertical, parallel vapor-liquid contacting sections. The top and bottom of the wall terminate in the column at a point distant from the respective end of the column such that there is open communication across the column interior at the top and bottom of the dividing wall. That is, vapor leaving the top of each section and liquid leaving the bottom of each section flows into a common section and is admixed. Each section will contain fractionation trays and/or packing intended to promote the separation. The feed stream to the column enters on a first receiving side of the dividing wall section of the column and typically flows into a middle portion of this receiving section of the column. The feed may, however, enter near the top or bottom of the receiving section. A further distinguishing point of a dividing wall column is that the feed stream is divided into at least three different product streams. One of these is removed from the partial-column product section of the column opposite the receiving section. The other two product streams are removed near the top and bottom of the column.

The control of a dividing wall column is more complicated and less intuitive than the control of a conventional column. It is the objective of this invention to provide a control system which can be employed within a dividing wall column to control the relative rates of vapor flow upward through the two adjacent sections located in the middle portion (dividing wall section) of the column. It is a further objective to provide a straight forward apparatus for controlling the vapor flow rates in the receiving and product sections of a dividing wall column, and thus to adjust the composition of the middle product of the column.

These objectives are met by a control system which employs a liquid trap out tray to collect essentially all of the liquid flowing downward through the column at a point at or near the top of the dividing wall and a pair of pressure differential monitors which are used to regulate the rate at which portions of this liquid are fed to trays located just above or at the top of each of the two sections. This regulated liquid flow rate in turn sets the liquid level on each of these trays. As the resistance to upward vapor flow through each tray is proportional to the height of liquid on the tray, regulating the liquid height on the tray in turn regulates the rate of vapor flow upward through the tray and therefore through the respective section of the column. This tray therefore acts as the control valve controlling the rate of vapor flow upward through the entire respective column section. The two parallel sections in the dividing wall portion of the column are referred to herein as "partial-column" sections since their cross-sectional area is less than that of the full column (circular) sections of the column at the upper and lower ends of the column.

The invention is best envisioned by reference to the drawing. In the drawing the receiving section of a dividing wall column 1 receives a feedstream from line 2. The multi-component feedstream of line 2 contains volatile components which will enter the vapor phase and rise upward through trays 7 in the receiving section of the column located on the left-hand side of the drawing. The feedstream also contains less volatile components which will be concentrated into the liquid phase descending toward the bottom of the receiving section of the column. The column is overall designed and operated to separate the entering components of the feedstream into an overhead product stream removed through line 3, a net bottoms product removed through line 5 and a side draw intermediate product stream removed from the right hand or product section of the dividing wall column 1 through line 4.

The inventive concept resides in the apparatus and method employed to control the relative rates of vapor movement upward within the two parallel sections of the column. However, in order to fully explain and set out the operating environment of the invention other control systems and control apparatus of a conventional nature are illustrated on the drawing. These include the overhead control system and the bottoms product control system. For instance, at the bottom of the column a stream of bottoms liquid is withdrawn through line 11 and divided into a first portion passed through line 12 and a second portion passed through line 41 for removal through line 5 as a net bottoms product. The rate of removal of the net bottoms product is controlled by a valve 45 in response to a signal transmitted to it from a temperature recorder controller 15 which monitors a temperature in a lower portion of the column. The portion of the bottom stream flowing through line 12 enters a reboiler 13 which adds heat energy to this flowing stream to generate hot liquid and/or vapor which is passed into the bottom portion of the column 1 through line 14. No control means is illustrated for the operation of the reboiler 13, although some control system would be provided. The rate of withdrawal of the side product stream of line 4 is controlled by the level controller 17 monitoring a liquid level in a bottom portion of the column. This controller transmits a signal to the valve 19 which controls the rate in which the side product is removed.

In a similar matter an overhead vapor stream is removed from the column through line 34 and passed through the overhead condenser 44. The overhead condenser 44 removes heat from the overhead vapor causing at least partial condensation of the overhead stream. The liquid formed in this manner is collected in the overhead receiver 35, with any remaining vapor removed through a line not shown as needed. The condensate is removed through line 16 and divided into the first portion removed through line 3 at a rate controlled by valve 42 and a second portion which is passed through line 18. The portion passed into line 18 serves as reflux to the top of the fractionation column with its rate controlled by valve 37 in response to a level controller 36 monitoring the liquid level in the overhead vessel 35. A temperature in upper portion of the column drives a temperature recorder controller 43 which generates the signal regulating the valve 42 controlling the withdrawal of the overhead product.

The internal structure of the column 1 includes a plurality of uniformly spaced apart fractionation trays 7. The fractionation trays may be spaced at different intervals in different parts of the column or in the two opposing sections of the column. A further variation is that the column may contain packing material in addition to or as a substitution for fractionation trays. After the fractionation trays 7 the most prominent feature of the column 1 is the relatively large dividing wall or baffle 6. The baffle starts in the lower portion of the column and ascends through the column defining the receiving section and product section of the dividing wall section until it reaches the height of the total trap-out tray 8. Baffle 6 is preferably substantially fluid tight meaning that no openings are intentionally left for the passage of vapor or liquid from one column section to the other. However, some leakage may occur. Leakage from the product section of the column to the receiving section of the column will only result in components recirculating whereas leakage from the receiving section to the product section will cause a decrease in the purity of the product of line 4. The baffle 6 may be a single metal plate or may be formed by a plurality of metal plates which are fastened together with suitable sealing systems. Dividing wall baffle 6 may be insulated or designed to reduce heat flow between the two sections of the column.

In an upper portion of the column there is provided a total liquid "trap out" tray 8. This is a substantially imperforate tray which collects all the liquid descending downward through the column at this point. Trays similar to this are conventional in the art. Several normal trays 7 are preferably located above it. The liquid descending onto the tray 8 is accumulated in the downcomer 31 and withdrawn through line 32. While the liquid is prevented from moving downward through the column at this point the vapor rising from below is allowed to pass upward through openings such as the "chimneys" or vents 40 provided for each section of the column. Such devices are employed as the liquid level may prevent use of customary tray type openings. The vapor rising out of each section of the column therefore is allowed to pass through the trap out tray and admix before passing upward into the next tray 7 in the column.

The liquid which is collected by the trap out tray 8 is removed through line 32 and divided into 3 portions. A first portion of this liquid is passed into a top of the receiving section of the column through line 22 at a rate controlled by valve 21. Valve 21 is controlled by a temperature recorder controller 20 which monitors the temperature in an upper portion of the column. Those skilled in the art will recognize that while the operation of this and other valves employed in the apparatus can be in response to a signal generated by a specified sensor or controller, modern electronic based control system components allow much variation in the actual signal which is generated and the location of the actual logic mechanism controlling the operation of the valve. Thus a sensor/controller may only generate a signal representative of the variable being monitored and transmit this to a controller or the sensor/controller can have the logic incorporated in it which allows it to generate a control signal which is directly sent to the valve. In either situation the valve is considered as being operated in response to a signal generated by the device. A second portion of the liquid collected in the downcomer 31 of the trap out tray is passed into line 24 and delivered to a tray 9 at a rate controlled by valve 23. Trays 9 may be the same or different in type or spacing in the two parallel partial-column contacting sections of the column. A third portion of the liquid collected by the trap out tray 8 is passed through line 33 to the top of the partial-column product section of the column. At the top of the product section it is divided into a first portion which flows through line 25 at a rate controlled by valve 26 and a second portion which flows through line 28 at a rate controlled by valve 27. Valve 27 is controlled by a liquid level controller 30 monitoring the height of the liquid on the total trap out tray 8 thereby preventing the accumulation of an excess amount of liquid on the trap out tray.

Just below the total trap out tray 8 there are provided two preferably similar fractionation trays 9, with one tray being located in each section of the column. These trays may be contacting trays similar to those employed in the remainder of the column or may have a different type of perforation or vapor opening. Each tray will also have a downcomer 10 to allow the passage of liquid to the next lower tray. The type of tray is not important and essentially any type of conventional fractionation tray can be employed at this point. The trays present a resistance to the upward passage of vapor through the main vapor-liquid contacting or decking surface of the tray. This resistance can be increased by increasing the amount of liquid present on the upper surface of the tray. Each tray and its downcomer must retain liquid or aerated liquid, often referred to as froth, on the upper surface of the tray. This liquid retention capability must be sufficient that the height of the liquid and/or froth is adjustable based upon the rate at which liquid is delivered from the respective lines 24 and 25. Therefore, by manipulating the amount of liquid which is present upon each of these two trays the resistance to upward vapor flow through the tray can be varied. At any point in time the pressure differential above and below the tray reflects this resistance to the upward vapor flow. This pressure differential is measured by the pressure differential cells 38 and 39 located in the receiving section and product section respectively of column 1. Each differential pressure cell monitors the pressure difference between the higher pressure below one of the trays 9 and the lower pressure above the tray. This pressure differential is compared to a set point previously inputted to the pressure differential cell and the flow rate of liquid onto the respective tray 9 is adjusted accordingly. That is, if the pressure differential is less than the desired set point the flow rate of liquid to the tray is increased. The desired pressure differential may be adjusted based upon periodic observations of the performance of a fractionation column and remain at a relatively constant value, or the differential may itself be subject to automated control which could be governed by the composition of one of the product streams.

The individual steps and components of the invention do not require novel equipment. All apparatus such as control valves, sensors and controllers needed to perform the invention are available commercially from several suppliers.

The subject control system and control method are believed applicable to any separation of volatile compounds which can be performed in a dividing wall fractional distillation column including for example the separation of a wide boiling range petroleum derived fraction into fractions having narrower boiling point ranges, the separation of aromatic hydrocarbons, the recovery of solvents or desorbents from the products of adsorptive or liquid-liquid separation processes, the separation of halogenated compounds, the separation of motor fuel blending components and the separation of product and recycle components in aromatic hydrocarbon alkylation, transalkylation and disproportionation processes.

One embodiment of the invention may be characterized as a method of controlling the vapor flow rate upward through two parallel partial-column contacting sections of a dividing wall section of a fractionation column which is being operated at fractionation conditions to perform a separation by fractional distillation, said method comprising the steps of restricting the upward escape of vapor from the two partial-column contacting sections of the column by means of a dedicated tray extending across the cross-section of each of the two partial-column contacting sections of the column, with vapor rising through each partial-column section passing through the respective dedicated trays and producing a pressure differential between the upper and lower surfaces of the respective trays; measuring the pressure differential between the upper and lower surface volumes of the dedicated trays of the two partial-column sections of the column; collecting essentially all of the liquid flowing downward in the column at the top of the dividing wall section of the column at a trap-out tray; adjusting the rate at which separate streams of said collected liquid are delivered to the two dedicated trays to adjust the level of liquid retained on each tray, and thus adjusting the relative rate of vapor flow upward through each of the two dedicated trays; and, delivering the remainder of said collected liquid to trays within the dividing wall section which are located below the dedicated trays.

What is claimed:

1. An apparatus for controlling the relative rate of upward vapor flow in each of two parallel, partial-column contacting sections located in a middle portion of a divided wall column, the column being divided into at least said two contacting sections by a vertical dividing wall, said apparatus comprising:

a.) a first differential pressure measuring device measuring the pressure differential between vapor-filled volumes located immediately above and below a first dedicated perforated tray located in an upper portion of a first partial-column contacting section of said column;

b.) a second differential pressure measuring device measuring the pressure differential between vapor-filled volumes located immediately above and below a second dedicated perforated tray located in an upper portion of a second partial-column contacting section of said column;

c.) a liquid collection tray located in the column above the first and second partial-column contacting sections of the column, the liquid collection tray having a liquid collection well and also having openings allowing the upward flow of vapor through the liquid collection tray;

d.) a liquid withdrawal and distribution conduit system communicating with the liquid collection well of the liquid collection tray and comprising conduits for the passage of liquid from the liquid collection well to other points in the fractionation column including a first conduit having an outlet discharging onto the first dedicated tray and a second conduit having an outlet discharging onto the second dedicated tray;

e.) a first flow control valve located in the first conduit and controlling the rate of liquid flow through the first conduit in response to a signal generated by the first pressure differential measuring device; and f.) a second flow control valve located in the second conduit and controlling the rate of liquid flow through the second conduit in response to a signal generated by the second pressure differential measuring device.

2. The apparatus of claim 1 wherein the liquid collection tray has only a single liquid collection well.

3. The apparatus of claim 1 wherein the liquid withdrawal and distribution conduit system also comprises a third conduit for discharging liquid into the first partial-column contacting section of the column at a point below the first dedicated tray and a fourth conduit for discharging liquid into the second partial-column contacting section of the column at a point below the second dedicated tray.

4. The apparatus of claim 3 wherein a third flow control valve is present in the fourth conduit and is regulated by a signal generated by a liquid level controller located on the liquid collection tray.

5. A method of controlling the vapor flow rate upward through two parallel partial-column contacting sections of a dividing wall section of a fractionation column which is being operated at fractionation conditions to perform a separation by fractional distillation, said method comprising the steps of:

a.) restricting the upward escape of vapor from the two partial-column contacting sections of the column by means of a dedicated tray extending across the cross-section of each of the two partial-column contacting sections of the column, with vapor rising through each partial-column section passing through the respective dedicated trays and producing a pressure differential between the upper and lower surfaces of the respective trays;

b.) measuring the pressure differential between the pressure above and the pressure below at least one of the dedicated trays of the two partial-column sections of the column;

c.) collecting essentially all of the liquid flowing downward in the column at the top of the dividing wall section of the column at a trap-out tray;

d.) adjusting the rate at which a stream of said collected liquid is delivered to at least one of the two dedicated trays in response to the pressure differential measured in step b.) to adjust the level of liquid retained on at least one of the dedicated trays, and thus adjusting the relative rate of vapor flow upward through each of the two dedicated trays; and e.) delivering the remainder of said collected liquid to trays within the dividing wall section which are located below the dedicated trays.

6. The method of claim 5 wherein said remainder of the collected liquid is divided into a first stream which is passed into a first partial-column section of the column at a rate set on the basis of a temperature measured in an upper portion of the first partial-column section of the column and a second stream which is passed into a second partial-column section of the column at a rate set by a liquid level measured at the trap-out tray.

7. A method of controlling the vapor flow rate upward through two parallel partial-column contacting sections of a dividing wall section of a fractionation column which is being operated at fractionation conditions to perform a separation by fractional distillation, said method comprising the steps of:

a.) restricting the upward escape of vapor from the two partial-column contacting sections of the column by means of a dedicated tray extending across the cross-section of each of the two partial-column contacting sections of the column, with vapor rising through each partial-column section passing through the respective dedicated trays and producing a pressure differential between the upper and lower surfaces of the respective trays;

b.) measuring the pressure differential between the pressure above and the pressure below the dedicated trays of the two partial-column sections of the column;

c.) collecting essentially all of the liquid flowing downward in the column at the top of the dividing wall section of the column at a trap-out tray;

d.) adjusting the rates at which separate streams of said collected liquid are delivered to the two dedicated trays in response to the pressure differential measured in step b.) to adjust the level of liquid retained on each dedicated tray; and e.) delivering the remainder of said collected liquid to trays within the dividing wall section which are located below the dedicated trays.

8. The method of claim 7 further comprising the step of separating said collected liquid into at least two separate streams in a distribution conduit system that communicates with the trap-out tray and delivers the collected liquid to other points in the fractionation column.

9. The method of claim 7 wherein said remainder of the collected liquid is divided into a first stream which is passed into a first partial-column section of the column at a rate set on the basis of a temperature measured in an upper portion of the first partial-column section of the column and a second stream which is passed into a second partial-column section of the column at a rate set by a liquid level measured at the trap-out tray.

10. The method of claim 7 wherein the rates at which said separate streams of collected liquid are delivered to the respective dedicated trays are adjusted in response to a comparison of a set point and the measured pressure differential.

11. The method of claim 10 wherein said set point is governed in response to the composition of a product stream from the fractionation column.

* * * * *

UNITED STATES PATENT AND TRADEMARK OFFICE
CERTIFICATE OF CORRECTION

| | | |
|---|---|---|
| PATENT NO. | : 6,558,515 B1 | Page 1 of 1 |
| APPLICATION NO. | : 09/840543 | |
| DATED | : May 6, 2003 | |
| INVENTOR(S) | : Paul C. Steacy | |

It is certified that error appears in the above-identified patent and that said Letters Patent is hereby corrected as shown below:

In column 8, line 59, the phrase --for each dedicated tray-- should be inserted after the word "differential".

Signed and Sealed this

Fourth Day of September, 2007

JON W. DUDAS
*Director of the United States Patent and Trademark Office*